United States Patent [19]

Gage et al.

[11] Patent Number: 5,537,383
[45] Date of Patent: Jul. 16, 1996

[54] OPTICAL DATA STORAGE SYSTEM WITH DIFFERENTIAL DATA DETECTION AND SOURCE NOISE SUBTRACTION FOR USE WITH MAGNETO-OPTIC, WRITE-ONCE AND OTHER OPTICAL MEDIA

[75] Inventors: Edward C. Gage, Fairport; Steven C. Dohmeier, Rochester, both of N.Y.

[73] Assignee: Eastman Kodak Company, Rochester, N.Y.

[21] Appl. No.: 397,701

[22] Filed: Mar. 1, 1995

[51] Int. Cl.⁶ ........................................................ G11B 7/00
[52] U.S. Cl. ........................ 369/116; 369/13; 369/44.25; 369/106; 369/124
[58] Field of Search ..................................... 369/116, 109, 369/110, 124, 13, 44.25, 44.32, 44.36, 106, 44.41

[56] References Cited

U.S. PATENT DOCUMENTS

| | | | |
|---|---|---|---|
| 4,617,654 | 10/1986 | Gross et al. | 369/46 |
| 4,691,308 | 9/1987 | Takagi et al. | 369/13 |
| 4,718,121 | 1/1988 | Epworth . | |
| 4,730,294 | 3/1988 | Funada | 369/46 |
| 4,774,615 | 9/1988 | Revelli et al. | 360/114 |
| 4,833,662 | 5/1989 | Yoda | 369/13 |
| 4,841,510 | 6/1989 | Yoshizawa | 369/46 |
| 4,881,216 | 11/1989 | Deguchi et al. | 369/116 |
| 4,890,273 | 12/1989 | Takeuchi et al. | 369/106 |
| 4,964,110 | 10/1990 | Horimai et al. | 369/110 |
| 4,992,754 | 2/1991 | Blauvelt et al. . | |
| 5,067,117 | 11/1991 | Shimizu et al. | 369/116 |
| 5,084,850 | 1/1992 | Yanagawa et al. | 369/44.41 |
| 5,113,386 | 5/1992 | Whitehead et al. | 369/44.41 |
| 5,132,639 | 7/1992 | Blauvelt et al. . | |
| 5,132,953 | 7/1992 | Matsubayashi | 369/44.37 |
| 5,146,449 | 9/1992 | Shimozawa | 369/106 |
| 5,166,509 | 11/1992 | Curran | 250/205 |
| 5,166,989 | 11/1992 | Kurdi et al. | 385/11 |
| 5,189,650 | 2/1993 | Watanabe et al. | 369/13 |
| 5,200,942 | 4/1993 | Hosobata et al. | 369/44.41 |
| 5,218,591 | 6/1993 | Shimamoto et al. | 369/116 |
| 5,247,501 | 9/1993 | Hashimoto et al. | 369/44.11 |
| 5,265,085 | 11/1993 | Jaquette et al. | 369/99 |
| 5,282,188 | 1/1994 | Gage | 369/110 |
| 5,287,340 | 2/1994 | Chapman et al. | 369/44.41 |
| 5,295,129 | 3/1994 | Lee | 369/122 |
| 5,297,128 | 3/1994 | Yamaguchi et al. | 369/116 |
| 5,309,423 | 5/1994 | Noguchi et al. | 369/110 |
| 5,339,302 | 8/1994 | Takahashi et al. | 369/54 |
| 5,363,363 | 11/1994 | Gage | 369/116 |
| 5,398,227 | 3/1995 | Miyaoka et al. | 369/116 |

FOREIGN PATENT DOCUMENTS

| | | |
|---|---|---|
| 225564 | 6/1987 | European Pat. Off. . |
| 310795 | 8/1988 | European Pat. Off. . |
| 60-93649 | 5/1985 | Japan . |
| 60-223044 | 11/1985 | Japan . |
| 60-223041 | 11/1985 | Japan . |

(List continued on next page.)

*Primary Examiner*—Loha Ben
*Attorney, Agent, or Firm*—Raymond L. Owens

[57] ABSTRACT

An apparatus and method for providing differential detection and source noise subtraction in data signals read from magneto-optic (MO), write-once (WO) or other types of optical storage media using an incident radiation beam. A source monitor signal is generated by detecting radiation from an optical source providing the radiation beam. An error detector generates an error signal corresponding to a difference between the source monitor signal and a reference signal. A power level of the radiation beam is adjusted in response to the error signal. A data signal generator is adapted to receive a return beam resulting from application of the radiation beam to the medium and to generate a WO data signal from the return beam. A signal combiner combines the data signal and the source monitor signal to provide a compensated WO data signal. An MO data signal may be generated using a separate AGC circuit to adjust the gain of each differential detection channel in accordance with low-frequency amplitude differences between the detected signals and a reference signal. The same reference signal may be used in both the source noise subtraction and the MO data signal generation.

22 Claims, 3 Drawing Sheets

FOREIGN PATENT DOCUMENTS

| | | |
|---|---|---|
| 63-18551 | 1/1988 | Japan . |
| 63-18549 | 1/1988 | Japan . |
| 63-298735 | 12/1988 | Japan . |
| 63-300448 | 12/1988 | Japan . |
| 1-59656 | 3/1989 | Japan . |
| 1-296440 | 11/1989 | Japan . |
| 1-315039 | 12/1989 | Japan . |
| 2-105357 | 4/1990 | Japan . |
| 2-152022 | 6/1990 | Japan . |
| 2-193347 | 7/1990 | Japan . |
| 2-287937 | 11/1990 | Japan . |
| 3-104041 | 5/1991 | Japan . |
| 3-142716 | 6/1991 | Japan . |
| 3-160645 | 7/1991 | Japan . |
| 3-292651 | 12/1991 | Japan . |
| 4-132031 | 5/1992 | Japan . |
| 4-298836 | 10/1992 | Japan . |
| 5-159404 | 6/1993 | Japan . |

OPTICAL DATA STORAGE SYSTEM WITH DIFFERENTIAL DATA DETECTION AND SOURCE NOISE SUBTRACTION FOR USE WITH MAGNETO-OPTIC, WRITE-ONCE AND OTHER OPTICAL MEDIA

CROSS-REFERENCE TO RELATED APPLICATION

Reference is made to commonly-assigned U.S. patent application Ser. No. 08/397,293, filed concurrently herewith, by Gage et al entitled "MAGNETO-OPTIC DATA STORAGE SYSTEM WITH DIFFERENTIAL DETECTION CHANNELS HAVING SEPARATE GAIN CONTROL CIRCUITS, the disclosure of which is incorporated herein by reference.

FIELD OF THE INVENTION

The present invention relates generally to optical data storage systems. More particularly, the present invention relates to an improved optical system which is capable of reading recorded data from both magneto-optic and write-once media as well as other types of optical media.

BACKGROUND OF THE INVENTION

Optical storage systems typically use a radiation beam generated and processed in an optical head to record data on and/or retrieve data from an optical storage medium. Many of these systems utilize differential detection in order to detect small reflected signal fluctuations in the presence of other signal components and/or system noise. An example is a conventional magneto-optic (MO) system, in which data is stored on an MO medium in the form of marks having a distinct magnetic orientation. MO systems generally utilize Kerr rotation of a return beam reflected from the MO medium to distinguish marked and unmarked areas. The Kerr rotation produces relatively small variations in the return beam and is therefore difficult to detect without differential detection. Differential detection channels are typically provided in the MO system by separating the return beam into two orthogonal polarization components using a polarization beam splitter. The components are incident on separate detectors, and the resulting detected signals are applied to inputs of a differential amplifier which generates a differential MO data signal representative of the stored data.

In systems with differential detection channels, it is usually important to maximize the common-mode noise rejection in order to ensure optimal performance. Significant degradations in output data signal carrier-to-noise ratio (CNR) may result if, for example, one or more of the elements in the differential channels do not provide substantially equivalent gain and/or phase variations. Prior art techniques addressing this problem have utilized, for example, strict optical head alignment and performance tolerances, or variable gain components in one or more of the differential detection channels. U.S. Pat. No. 4,691,308 discloses an MO system with differential detection channels and a variable gain in one channel. The variable gain is adjusted in response to an error signal corresponding to amplitude differences between the detected signals. The variable gain adjustment attempts to reduce the amplitude difference between the detected signals such that common-mode rejection in the differential amplifier is improved. However, this one-channel variable gain system is susceptible to a number of problems, including long-term drift in signal levels, variable phase shifts as a function of signal level, and poor recovery from non-ideal conditions such as out-of-focus or media defects. Other problems with one-channel variable gain systems include the inability to adequately compensate for spurious output signal modulation resulting from, for example, media birefringence.

Japanese Patent Publication No. 4-298836 entitled "Magneto-optical Recording and Reproducing Device" appears to disclose an MO detection system which uses a pair of level control circuits controlled in accordance with "double refractivity information." However, this system does not appear to improve common-mode rejection in differential detection. Furthermore, it apparently utilizes a common control signal for both level control circuits and thus fails to solve the long-term drift, output signal modulation and other problems inherent in the one-channel variable gain system of U.S. Pat. No. 4,691,308.

Optical systems with differential detection channels can also be used to generate a density-type data signal from a write-once (WO) medium by summing the two detected signals. As the term is used herein, WO media are intended to include read-only media such as compact disks (CDs) which are usually generated from a master recording. A system which generates a WO data signal is often susceptible to the effects of a number of different types of system noise. For example, a laser diode or other optical source used to read recorded data may exhibit mode-hopping or other instabilities which cause variations in the power level of the read beam. Such instabilities may be generally referred to as optical source noise or relative intensity noise (RIN). RIN represents a type of common-mode noise, that is, a noise component which is common to differential detection channels in the optical head. As noted above, common-mode noise can be substantially eliminated in generating an MO data signal because the detected signals are subtracted. However, common-mode noise remains in a WO data signal in which the detected signals are summed.

An exemplary technique which uses subtraction of a front facet monitor signal to limit the effects of RIN and other types of common-mode system noise on a WO data signal is described in U.S. Pat. No. 5,363,363 entitled "Apparatus and Method For Laser Noise Cancellation in an Optical Storage System Using a Front Facet Monitor Signal," which is assigned to the assignee of the present invention and incorporated by reference herein. One embodiment of the technique involves subtracting a front facet monitor (FFM) signal representative of the optical source power level from the WO data signal in a differential amplifier. The resulting noise reduction generally depends upon proper gain and phase matching of the data and FFM signal channels. Commonly assigned U.S. patent application Ser. No. 309, 837 filed Sep. 21, 1994 by Dohmeier et al, entitled "Apparatus and Method for Controllable Gain and Phase Matching in an Optical Data Storage System with Source Noise Subtraction", now U.S. Pat. No. 5,491,682, discloses the use of a variable gain servo loop to match the amplitude and phase of the data and FFM signals prior to subtraction. The gain of either the data or FFM signal path is varied in accordance with, for example, an error signal corresponding to low-frequency amplitude differences between the data and FFM signals.

Although the above-noted exemplary source noise subtraction techniques provide considerable improvement in WO data signal quality, there remains a need for a universal optical system which can provide both improved differential detection for MO signals as well as source noise subtraction for WO signals in a simplified implementation which is suitable for digital control and avoids the spurious modulation, long-term drift and other problems of prior art systems.

SUMMARY OF THE INVENTION

The present invention is directed to an apparatus and method which can provide improved differential detection and source noise subtraction in an optical system, such that both magneto-optic (MO) and write-once (WO) data signals can be efficiently generated in the same system. An exemplary apparatus in accordance with one aspect of the present invention may include a source monitor detector to generate a source monitor signal by detecting radiation from an optical source providing the radiation beam; an error detector coupled between the source monitor detector and the optical source, the error detector operative to generate an error signal corresponding to a difference between the source monitor signal and a reference signal, wherein a power level of the radiation beam is adjusted in response to the error signal; a data signal generator adapted to receive a return beam resulting from application of the radiation beam to the medium and to generate a data signal from the return beam; and a signal combiner coupled to the source monitor detector and the data signal generator and operative to combine the data signal and the source monitor signal to provide a compensated data signal. The data signal generator may be used to generate a WO data signal from a WO medium. An MO data signal may be generated using a separate gain control circuit in each of two differential detection channels. The gain control circuits automatically adjust the gain of the differential detection channels in response to, for example, low-frequency amplitude differences between the corresponding detected signals and the reference signal.

In accordance with another aspect of the present invention, a method is provided which may include the steps of generating a source monitor signal using radiation from an optical source providing the radiation beam; generating an error signal corresponding to a difference between the source monitor signal and a reference signal; controlling a power level of the radiation beam in response to the error signal; generating a data signal from a return beam resulting from application of the radiation beam to the medium; and combining the data signal and the source monitor signal to provide a compensated data signal. The data signal may be a WO data signal. An MO data signal can be generated by controlling the gain of each differential detection channel in response to, for example, low-frequency amplitude differences between the corresponding detected signals and the reference signal.

Another aspect of the invention concerns an optical system with source noise subtraction and a single data detection channel. The system may be used to generate a compensated WO data signal, and may utilize a variable gain amplifier in the data detection channel which is controlled in response to, for example, low-frequency amplitude differences between the detected signal and a reference signal. A source power control circuit may utilize the same or a different reference signal to determine appropriate adjustments to optical source power levels.

The present invention permits the generation of a differential MO data signal from an MO medium and a density-type WO data signal from a WO media and therefore can be implemented as a universal optical head suitable for use with MO, WO and other types of optical media. Improved common-mode rejection, output data signal CNR and response to non-ideal conditions is provided for both the MO data signal generation and for WO source noise subtraction. Spurious output modulation and long-term signal level drift are significantly reduced relative to prior art variable gain systems. Furthermore, one or more set point reference voltages may be used as reference signals to control variable gain in the source monitor and differential data signal channels. The reference voltages can be readily configured by a microprocessor or other digital processor to adjust signal levels during recording, optical disk drive start-up or other phases of system operation. The present invention can provide additional advantages in optical recording applications such as, for example, direct-read-during-write (DRDW) and beta measurements of recording signal modulation depth.

Further features of the invention, its nature and various advantages will become more apparent from the accompanying drawings and following detailed description of the invention.

DETAILED DESCRIPTION OF THE INVENTION

Although the present invention will be illustrated herein primarily in terms of generating magneto-optic (MO) and write-once (WO) data signals from MO and WO media, respectively, it should be understood that this is by way of example and not limitation. The invention may be utilized with any of a number of other types of optical media, including ablative and phase-change media. Furthermore, the media may be either erasable or non-erasable. Those skilled in the art can readily adapt the teachings of the present invention to these and other alternative media.

Figure 1:
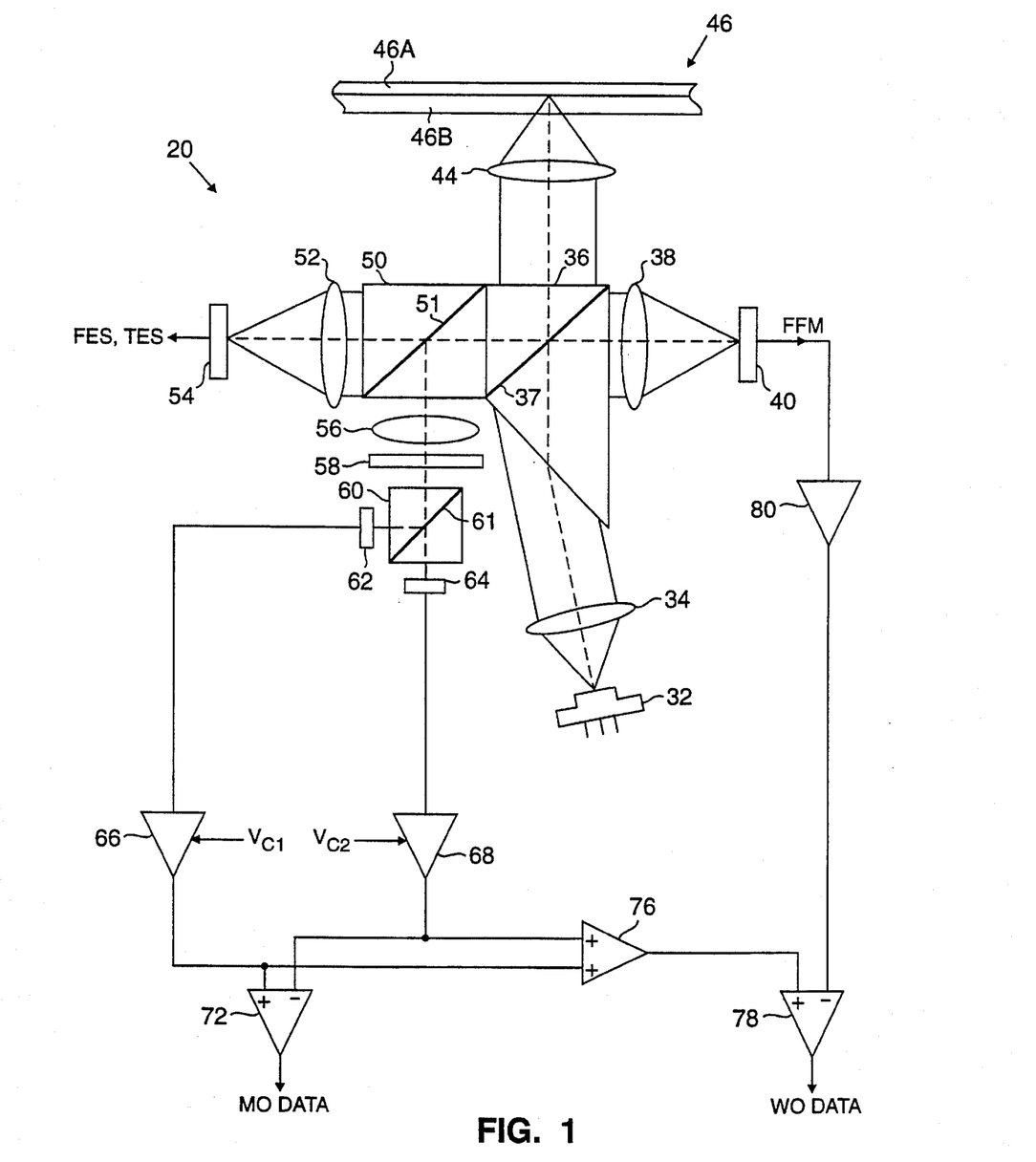
FIG. 1 shows an exemplary optical data storage system with source noise subtraction and separately-controlled variable gain differential detection channels in accordance with the present invention.

FIG. 1 shows an exemplary optical storage system 20 which utilizes differential detection channels to generate both MO and WO data signals. An incident radiation beam is generated by an optical source 32, which may be, for example, a laser diode, a laser or an LED. The source 32 produces an incident radiation beam at a given wavelength, which will generally vary depending upon the application. An exemplary wavelength suitable for use in the system 20 is about 780 nanometers. The radiation beam from optical source 32 is collimated by a collimating lens 34, which in this embodiment may have a focal length on the order of 8 mm. The collimated radiation beam is transmitted through a polarization beam expander/splitter 36. Alternative beam expansion techniques could be used, such as including a circularizing lens (not shown) in the path of the incident beam, and would generally alter the desired focal length of lens 34. A suitable circularizing lens is the model VPS700 lens available from Blue Sky Research of San Jose, Calif.

The beam expander/splitter 36 may have an s-polarization reflectivity of about 100% and a p-polarization reflectivity of about 20%, indicating that 100% and 20% of the intensity of the s-polarized beam components and p-polarized beam components, respectively, are reflected by an internal surface 37, and any remaining portions are transmitted through the surface 37. A portion of the incident radiation beam is thus reflected by surface 37 toward a detector focusing lens 38 and thereby focused onto a front facet detector 40. The reflected portion of the linearly-polarized radiation beam thus includes both s-polarized and p-polarized components, which are detected in detector 40 to provide an indication of the intensity level of the incident radiation beam. The front facet detector 40 is also referred to as a front facet monitor (FFM) or, more generally, an optical source monitor. An FFM signal from detector 40 may be used, for example, to normalize a tracking or MO data signal, or in a source power servo loop to maintain the output power level of source 32 at a desired value. As will be described in greater detail below, the FFM signal is also used in a front facet subtraction technique to reduce source noise in a WO data signal. An exemplary front facet subtraction technique is described in U.S. Pat. No. 5,363,363 entitled "Apparatus and Method for Laser Noise Cancellation in an Optical Storage System Using a Front Facet Monitor Signal," which is assigned to the assignee of the present invention and incorporated by reference herein. Any of a number of alternative techniques could also be used to detect radiation from the optical source in order to provide an indication of the intensity level of the incident beam. For example, radiation from a rear facet of a laser diode optical source could be detected by suitable arrangement of detector 40 in a path of the rear facet radiation. It should be noted, however, that front facet radiation often exhibits better linearity and repeatability, and is less susceptible to temperature variation, than rear facet radiation.

The portion of the incident radiation beam which is not reflected by surface 37 to front facet detector 40 passes through surface 37 and is incident on an objective lens 44. The surface 37 of polarization beam splitter/expander 36 transmits a linear p-polarization of the radiation beam, which is perpendicular to the s-polarized portion of the radiation beam reflected by surface 37. The direction of the incident beam may be altered by including additional optical elements (not shown), such as a turning prism or fully-reflecting mirror, between the beam splitter 36 and the objective lens 44. For example, a turning prism or reflecting mirror could be arranged to reflect the beams by 90° to facilitate placement of the components of system 20 relative to the storage medium in a reduced-height optical disk drive.

Objective lens 44 focuses the incident beam onto an optical storage medium 46. Optical components 34, 36 and 44 represent only an exemplary means of applying an incident radiation beam to the medium, and any of a number of other arrangements of components could be used as an application means herein. The storage medium 46 typically includes data tracks (not shown) arranged in a spiral or concentric circles on a data storage surface 46A. A portion of the medium 46 is shown in a side-sectional view in FIG. 1. The storage medium may include a transparent substrate 46B which serves as a protective layer over the data storage surface 46A. The exemplary medium 46 may also include a pregroove or similar light-diffracting structure suitable for generating a tracking error signal (TES) using known techniques. The incident radiation beam reads data previously recorded in the form of marks on storage medium 46 by detecting variations in a return beam reflected from the medium. The system 20 may also be used to record data on the medium 46 by modifying the power level of the incident beam or by providing additional recording system elements, the placement and operation of which are generally well-known in the art.

It will now be assumed that the medium 46 is an MO medium. The incident beam applied to the MO medium usually-has a substantially linear polarization. Interaction with the data storage surface 46A causes the incident radiation beam to be reflected and diffracted therefrom. The resulting radiation beam, referred to herein as a return beam, generally has an elliptical polarization due to Kerr effect variations produced at the MO medium surface. It should be noted that in other embodiments the return beam may be either reflected or diffracted from the medium, or even transmitted through the medium in embodiments utilizing, for example, an optical tape storage medium. The return beam is collimated by objective lens 44, substantially reflected by surface 37, and then applied to a polarization beam splitter 50 which may have an s-polarization reflectivity of about 100% and a p-polarization reflectivity of about 75%. As a result, surface 51 transmits about 25% of the p-polarized portion of the beam incident thereon to a detector focusing lens 52. The lens 52 focuses the transmitted portion of the beam onto a detector 54, which may include multiple detector elements. The detector 54 may be used to generate a TES as well as a focus error signal (FES) using well-known techniques.

The portion of the return beam which is not transmitted through surface 51 is reflected by surface 51 toward a lens 56 and through a general wave plate 58. The general wave plate 58 modifies the polarization of the portion of the return beam passing through it by a given retardance value between about 90° and 180°. The actual retardance value selected may vary with the application. Factors which should be taken into account in selecting a suitable retardance value include optical head properties, such as phase shifts introduced by beam splitters or other elements, and media properties such as media birefringence. Details regarding selection of a suitable retardance value for wave plate 58 to optimize the data signal CNR in a given embodiment may be found in U.S. Pat. No. 5,282,188, which is assigned to the assignee of the present invention and incorporated by reference herein. Those skilled in the art will recognize that wave plate 58 may be used with any of a number of alternative retardance values and/or plate rotations. In other embodiments of the present invention, the wave plate 58 may be replaced with a liquid crystal variable retarder, such that different retardance values may be readily selected depending on whether the system 20 is being used with an MO or WO medium. The variable retarder can be configured in the manner described in U.S. Pat. No. 5,282,188.

The portion of the return beam transmitted through wave plate 58 is then applied to another polarization beam splitter 60. A surface 61 reflects an s-polarized component of the return beam to a first detector 62 and transmits a p-polarized component to a second detector 64. The polarization beam splitter surfaces 37, 51 and 61 may be, for example, multi-layer coatings which reflect and/or transmit desired amounts of s-polarized and p-polarized light. It should be noted that any of a number of alternative differential detection arrangements could be used in system 20. For example, the beam splitter 60 could be replaced with a Wollaston beam splitter and the position of detectors 62, 64 could be adjusted such that one detector receives components of the return beam having a p-polarization while the other receives components having an s-polarization. As another alternative, the general wave plate 58 could be replaced with a phase plate selected to remove phase ellipticity in the return beam, and beam splitter 60 could be a rotatable Wollaston beam splitter rotated to a fixed angle of about 45°. The beam splitter 60 could also be replaced with a larger beam splitter, such as beam splitter 50. In general, the beam splitter 60 separates the portion of the return beam incident thereon into first and second polarization components which are supplied to detectors 62, 64, respectively. The detectors 62, 64 generate first and second detected electrical signals from the polarization components. Detectors 62, 64 may be, for example, positive-intrinsic-negative (PIN) or avalanche photodiodes, or any other device capable of detecting incident optical radiation. Suitable photodiodes for detectors 42, 46 include part Nos. FFD100 and FFD200, from EG&G Optoelectronics of Quebec, Canada.

The first and second detected signals from detectors 62, 64, respectively, may be used to provide a differential MO data signal which is indicative of data recorded on MO medium 46. One differential detection channel in system 20 includes detector 62 and a first variable gain amplifier 66, while the other differential channel includes detector 64 and a second variable gain amplifier 68. The gains of amplifiers 66, 68 are varied in accordance with control signals $V_{C1}$, $V_{C2}$, respectively, as will be described in more detail below in conjunction with FIG. 2. The outputs of the variable gain amplifiers 66, 68 are applied to inputs of a differential amplifier 72 which generates an MO data signal as the difference between the first and second detected signals. Other signal difference circuits suitable for generating an MO data signal from the first and second detected signals could be used in place of differential amplifier 72.

A WO data signal can be generated in the system 20 from a return beam reflected from, for example, a phase change or ablative WO medium. The return beam is directed through optical components 44, 36, 50, 56, 58 and 60 in the manner previously described in conjunction with the generation of an MO data signal. Detectors 62, 64 generate detected signals which pass through variable gain amplifiers 66, 68, respectively. A summing amplifier 76 receives the amplified detected signals and combines them to form a sum density-type WO data signal. Data signals can thus be generated for both MO and WO media in the system of FIG. 1 by appropriate processing of the detected signals from detectors 62, 64. Alternative signal combiners may be utilized in place of summing amplifier 76.

Optical system 20 also implements a source noise subtraction technique. The uncompensated WO data signal output of summing amplifier 76 is applied to one input of a differential amplifier 78. The FFM signal from front facet detector 40 is applied to an amplifier 80 and the amplified FFM signal is then applied to another input of differential amplifier 78. The amplitude and phase of the FFM and WO signals at the input of amplifier 78 are equalized in a manner to be described in detail below in conjunction with FIG. 2. The output of amplifier 78 is a compensated WO data signal in which source noise-induced fluctuations are substantially reduced.

System 20 may include additional elements (not shown) suitable for processing the FFM signal and the detected data signals. For example, an analog-to-digital converter, microprocessor, memory, and digital-to-analog converter may be included to obtain and process samples of the FFM and data signals. The control signals for variable gain amplifiers 66, 68 could be adjusted in response to operating commands generated by the microprocessor. This technique can be used to adjust signal levels during recording, optical disk drive start-up or other phases of system operation.

Figure 2:
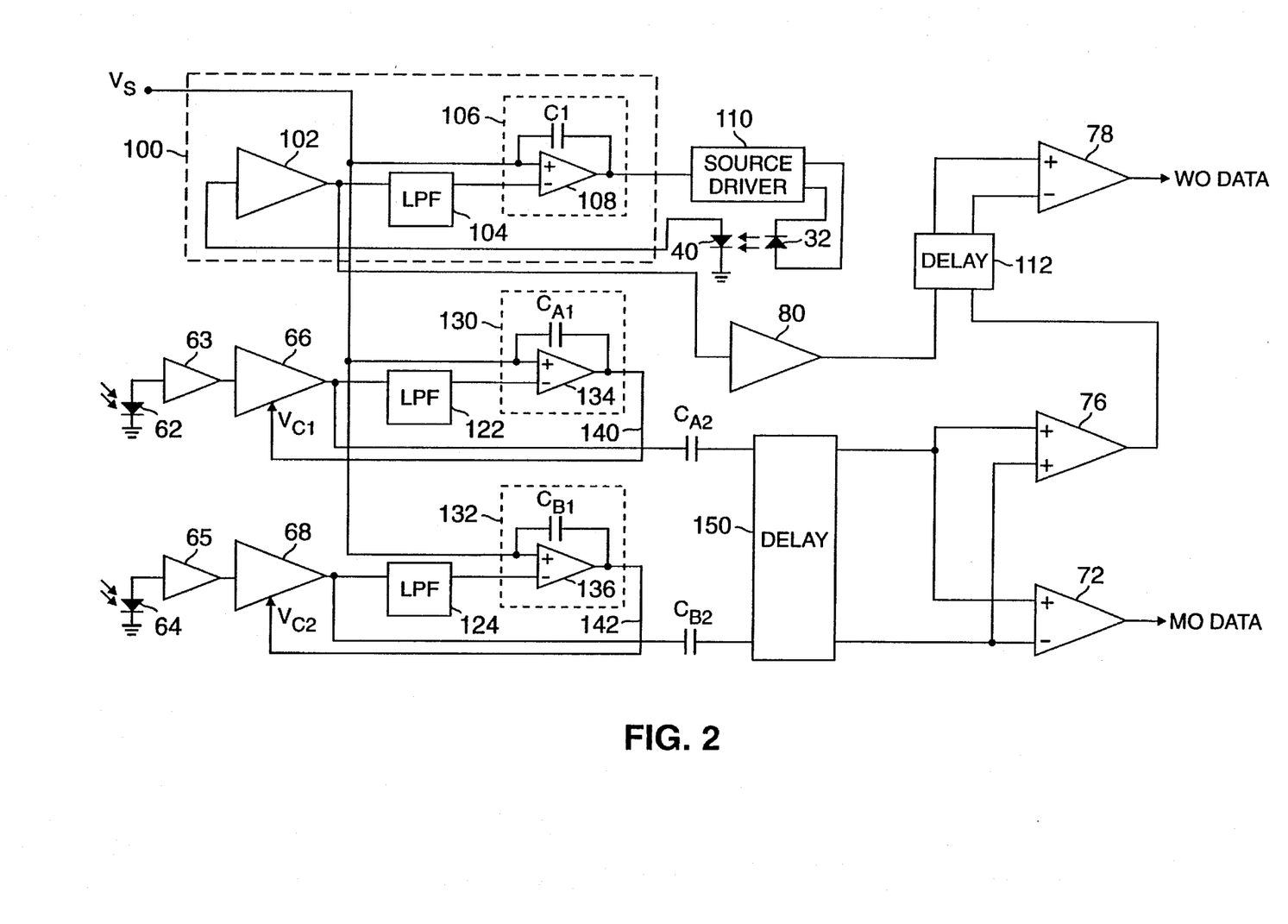
FIG. 2 is a schematic diagram illustrating the source noise subtraction and differential detection circuitry of FIG. 1 in greater detail.

FIG. 2 is a schematic diagram showing the source noise subtraction and differential detection channels of system 20 in greater detail. The source noise subtraction portion of FIG. 2 includes a source power control circuit 100. Front facet detector 40 supplies an FFM signal to a preamplifier 102 in the circuit 100 which may be, for example, an OPA620 amplifier from Burr-Brown, Inc. of Tucson, Ariz. The detector 40 and preamplifier 102 preferably have a combined bandwidth of approximately three times the highest data signal frequency in the system, although other bandwidths could also be used. The FFM signal output of preamplifier 102 is applied to amplifier 80 as described in conjunction with FIG. 1 above. The FFM signal is also applied to a low pass filter 104 which filters the FFM signal such that low-frequency (LF) components thereof are supplied to an input of an integrating amplifier 108 in an error detector/integrator 106. The cut-off frequency of filter 104 may be, for example, selected between about 10 kHz and 100 kHz in order to minimize the effects of system noise on the source power.

Another input of integrating amplifier 108 receives a set point voltage $V_S$ from, for example, a microprocessor-controlled voltage source (not shown). Other suitable reference voltages or, more generally, reference signals could be used in place of the set point voltage $V_S$. Integrating amplifier 108 includes a capacitive element C1 in a feedback path thereof such that differences between the LF components of the FFM signal and the voltage $V_S$ are integrated over time. The voltage $V_S$ thus sets a value to which the circuit 100 servos the LF components of the FFM signal. The output of the amplifier 108 is applied as a control signal to a source driver 110 connected to source 32. The source driver converts the output voltage of amplifier 108 to a drive current suitable for controlling the output power of source 32. The circuit 100 adjusts the source driver output and thereby the intensity level of the radiation beam generated by source 32 until the difference between $V_S$ and the LF components of the FFM signal is reduced to zero. The circuit 100, source driver 110, source 32 and front facet detector 40 thus form a source power servo loop which adjusts source power such that the LF components of the FFM signal track the set point voltage $V_S$.

As noted above, a compensated WO data signal is generated by subtracting the uncompensated sum data signal at the output of summing amplifier 76 from the FFM signal supplied by amplifier 80. Maximum common-mode noise rejection for the compensated WO data signal output is realized when the sum data signal matches the FFM signal in both amplitude and phase. In the embodiment of FIG. 2, the sum data signal is driven to a level of about $2V_S$ by first and second automatic gain control (AGC) circuits in a manner to be described below. The amplifier 80 therefore preferably has a gain of about 2.0 such that the FFM signal, which is driven to a value of about $V_S$ by the source power servo loop, is amplitude matched with the sum data signal at the input of differential amplifier 78. Alternatively, the sum data signal may be divided approximately in half prior to front facet subtraction, or a reference voltage of $2V_S$ could be used in the source power servo loop. The bandwidth of the AGC circuits in the data detection channels is preferably comparable to the bandwidth of the front facet detector 40 and preamplifier 102 combination, such that wideband matching of amplitude and phase are provided for both the FFM and sum data signal.

A delay element 112 is connected between amplifiers 76, 80 and the differential amplifier 78 in order to provide proper phase matching of the FFM and sum data signal at the input of amplifier 78. In general, the amplifiers used in the circuitry of FIG. 2 exhibit relatively linear group delay responses. A constant group delay can generally be considered as a fixed signal propagation time independent of frequency. Thus, the FFM and sum data signal channels may be phase equalized using a passive analog delay line providing a fixed amount of delay. The delay element 112 may therefore be, for example, a manually or electronically controlled programmable delay line which provides a selectable amount of delay in discrete increments, or multiple delay lines providing a desired total amount of delay. One suitable device is the ten nanosecond, ten tap variable delay line part No. 60Z14A010H from Sprague Electric Co. of Stamford, Conn. Alternatively, the delay element 112 may be a single fixed amount of delay calculated to provide the desired phase matching at the input of amplifier 78. The term "delay line" as used herein refers to devices providing either fixed or adjustable amounts of delay using physical lengths of transmission line or any other suitable delay mechanism. The amount of delay provided by delay element 112 will generally vary depending upon the relative length of the FFM and sum data signal paths. It is preferred that the phase difference between the two signals at the input of differential amplifier 78 is reduced to a value less than about five degrees at the highest data signal frequency of interest, although larger phase differences may be acceptable in a given application. Of course, reducing the phase difference to zero will produce maximum common-mode noise rejection in amplifier 78. Although the delay element 112 is shown in both signal channels in FIG. 2, it should be understood that delay may be introduced in only one of the channels.

The differential detection channels in FIG. 2 will now be described. The detection channels each include a separate automatic gain control (AGC) circuit in which a control signal $V_{C1}$ or $V_{C2}$ is generated and used to adjust the gain of amplifier 66 or 68, respectively. The variable gains are adjusted such that detected signal high-frequency (HF) components provided to the differential amplifier 72 are substantially matched in amplitude. The gain adjustments are made by comparing direct-current (DC) and other LF components in the detected signals to a predetermined set point voltage $V_S$. The AGC circuits are each part of a servo loop which matches detected signal amplitudes at the input of differential amplifier 72 and thereby maximizes common-mode rejection and the output SNR of the MO data signal. The two AGC servo loops include variable gain amplifiers 66, 68, low pass filters 122, 124, error detector/integrators 130, 132 and feedback control signal lines 140, 142. In this embodiment, the variable gain amplifiers 66, 68 are connected to the detectors 62, 64, respectively, through preamplifiers 63, 65, respectively. Preamplifiers 63, 65 may be OPA620 amplifiers from Burr-Brown, Inc. of Tucson, Ariz. In other embodiments, preamplifiers 63, 65 could be eliminated and variable gain amplifiers 66, 68 could serve as preamplifiers.

The detected signals from amplifiers 66, 68 are passed through the low-pass filters 122, 124 and supplied to the error detector/integrators 130, 132, respectively. The error detector/integrators compare the filtered signals with the predetermined set point voltage $V_S$ in amplifiers 134, 136, respectively, to generate error signals. The amplifiers 134, 136 are configured to integrate the detected error signals over time using capacitors $C_{A1}$, $C_{B1}$, respectively. The integrated error signal outputs of amplifiers 134, 136 are fed back via lines 140, 142 as control signal inputs $V_{C1}$, $V_{C2}$ to amplifiers 66, 68, respectively. Each AGC servo loop acts to maintain an error signal of about zero volts within the bandwidth of the loop. The detected signals from amplifiers 66, 68 are also supplied via capacitors $C_{A2}$ and $C_{B2}$ to differential amplifier 72. The capacitors $C_{A2}$ and $C_{B2}$ serve to block the DC components of the detected signals from reaching differential amplifier 72, while passing only alternating-current (AC) components of the detected signals to amplifier 72. Although those skilled in the art will recognize that $C_{A2}$ and $C_{B2}$ do not provide a sharp cut-off at a particular frequency, in this embodiment, AC components are generally considered to be components other than DC. In alternative embodiments, $C_{A2}$ and $C_{B2}$ may be replaced with more complex signal filters to provide any desired frequency response in the channel, or may be eliminated such that the differential amplifier 72 receives all signal components including DC components.

A delay element 150 is used to adjust the detected signal phase in at least one of the detected signal channels such that the detected signals are in-phase at the input of amplifier 72. As was the case with delay element 112 described above, the delay element 150 may be a variable delay line, a fixed amount of predetermined delay or any other suitable means for adjusting the phase of either the first or second detected signal, or both, before the signal difference is generated in amplifier 72. Again, the phase difference is preferably reduced to less than about five degrees at the highest data signal frequency of interest.

The variable gain amplifiers 66, 68 are preferably matched amplifiers in a device such as the Model No. AD602 available from Analog Devices of Norwood, Mass. The AD602 package includes two matched, low noise, voltage-controlled amplifiers with relatively stable group delay, a maximum control bandwidth of about 1 MHz, an amplification bandwidth of about 35 MHz independent of gain setting, a gain scaling of about 32 dB/volt and a gain range of about −10 dB to +30 dB. Of course, amplifiers with other bandwidth and gain parameters could also be used. Alternative variable gain amplifiers include the part Nos. CLC 520 or CLC 522 from Comlinear, Inc. of Fort Collins, Colo., and the part No. VCA-610 from Burr-Brown, Inc. of Tucson, Ariz. It should be emphasized that these are examples only, and numerous other alternatives will be apparent to those skilled in the art. Other embodiments could use different types of variable gain circuits to alter signal level in response to an input control signal. For example, a variable attenuator providing a variable amount of signal attenuation in response to a control input is considered a variable gain circuit herein.

The low pass filters 122, 124 limit the bandwidth of the portion of the detected signal that is fed back to control the gain of the variable gain amplifiers 66, 68, respectively. This bandwidth limiting reduces potential oscillations and modulation noise in the loops before the error detector/integrators 130, 132. Modulation noise can result when HF components of the first and second detected signals have different amplitudes or a duty cycle other than fifty percent. A mismatch in detected signal amplitudes at the input of differential amplifier 72 can then arise even though the DC and/or LF components of the detected signals have been equalized by the servo loops. The magnitude of the channel gain error from modulation noise is generally dependent on the cross-channel amplitude mismatch, the degree to which the duty cycle deviates from fifty percent, and the amplitude of the DC signal components. The filters 122, 124 may be implemented as, for example, single-pole resistor-capacitor (RC) networks. Higher order filters could also be used, depending on the amount of filtering required in a given application. A single-pole filter suitable for use in a system in which the data signal HF components range from about 2.5 to 5 MHz has a 3 dB passband of about 50 kHz and reduces modulation noise by approximately 35 dB. The cut-off frequency of filters 122, 124 is limited on the high end by the system data rate and on the low end by the highest frequency of the system perturbations that the servo is required to track. For example, in certain applications, it may be desirable for the servos to track media birefringence-induced distortions at frequencies of up to 5 kHz or more. A suitable cut-off frequency for use in many optical storage applications is about 100 kHz. This cut-off frequency refers to a frequency above which signal components are attenuated by about 10 dB or more.

Integrator amplifiers 134, 136 are preferably low offset, low bandwidth devices such as the OP400 amplifiers from Analog Devices of Norwood, Mass. A low offset can limit channel gain error, and a low bandwidth can provide further filtering of modulation noise. In a preferred embodiment, the bandwidth of amplifiers 134, 136 is about six to ten times the cutoff frequency of low pass filters 122, 124. This value maintains the low pass filter passband as the dominant passband control of the system.

The embodiment of the invention illustrated in FIGS. 1 and 2 provides a number of advantages. For example, a single set point voltage $V_S$ can be used to control both the source power control loop and the AGC circuits in the differential detection channels. Overall system control and processing is therefore considerably simplified. A microprocessor or other digital processor can direct operation of the system to achieve desired results in a number of different phases of operation. The set point voltage can be readily adjusted to different values during disk drive start-up, read operations, and recording operations in order to obtain optimal system performance and to avoid damaging system components. Furthermore, this improved control is provided without significantly increasing the cost or complexity of the optical head. The invention permits implementation of a universal optical head capable of generating MO, WO and other data signals from a variety of different optical media.

Alternative embodiments could use different set point voltages or reference signals for each gain control circuit, rather than a single common reference as shown in FIG. 2. Also, the gain control circuits could operate using high-frequency components of the detected signals, in addition to or in place of the low-frequency components used in the FIG. 2 embodiment. Those skilled in the art will recognize that the invention may be implemented using digital servo loops, and that integrators may be replaced with other suitable signal processing circuits.

Figure 3:
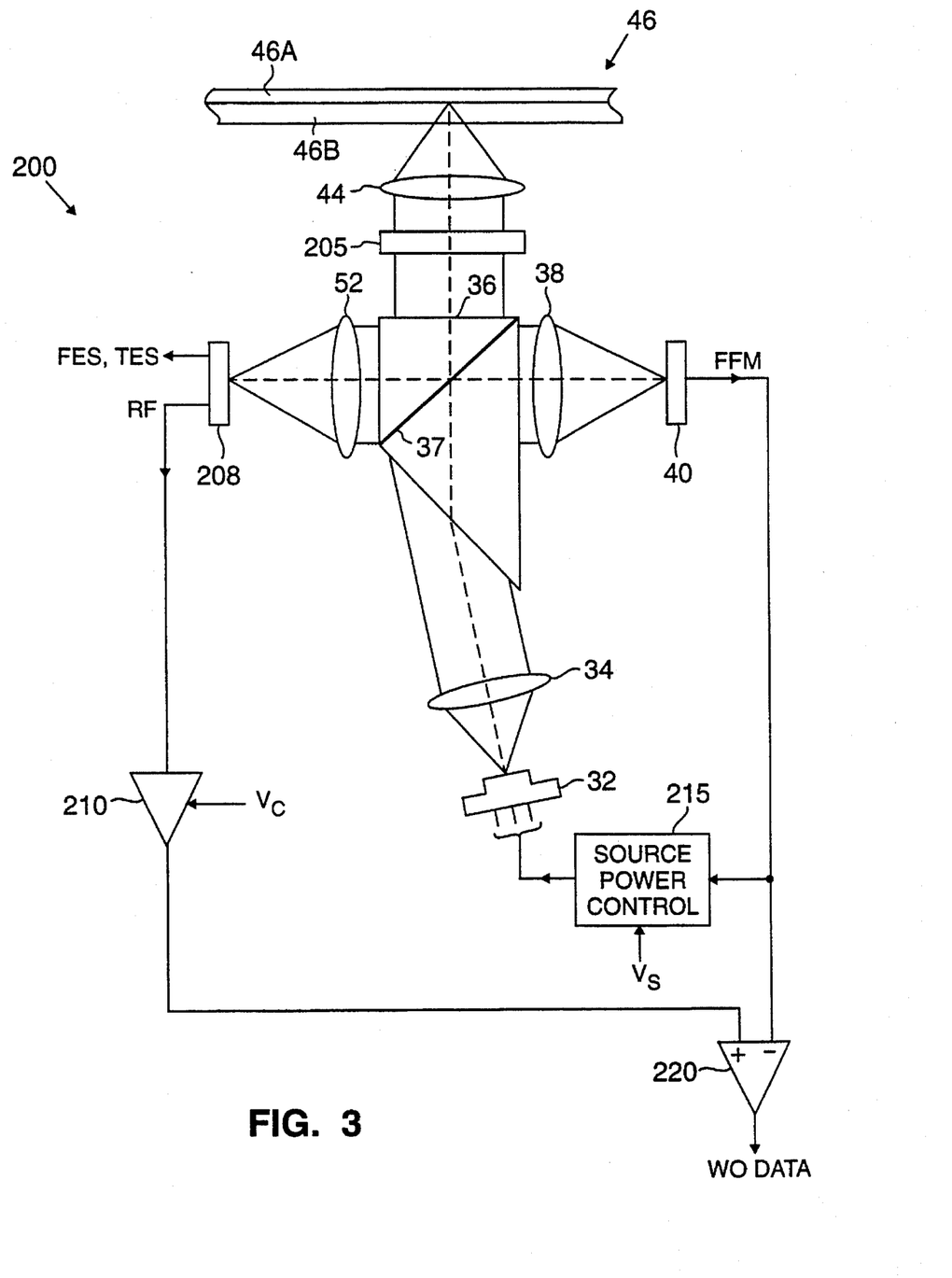
FIG. 3 shows an exemplary optical data storage system with source noise subtraction and a single data detection channel in accordance with the invention.

FIG. 3 shows an exemplary write-once (WO) optical storage system 200 in accordance with the invention. The system 200 includes a number of elements previously described in conjunction with FIG. 1, and these elements operate in a similar manner in this embodiment. In system 200, a quarter-wave plate 205 is arranged between beam expander/splitter 36 and objective lens 44. The quarter-wave plate 205 alters the polarization of the return beam in a well-known manner such that the return beam is directed by surface 37 toward lens 52. A detector array 208 generates a data signal, also referred to as an RF signal, as well as focus error and tracking error signals. The RF output of detector array 208 represents a WO data signal in this embodiment. The data signal passes through a variable gain amplifier 210, the gain of which is controllable in accordance with a control signal $V_C$. The control signal $V_C$ may be generated, for example, using low pass filter 122 and error detector/integrator 130 arranged and operating in the manner described in conjunction with FIG. 2. A source monitor signal is generated from detector 40 in the manner previously described, and is applied to a source power control circuit 215. The control circuit 215 receives a reference signal in the form of a set point voltage $V_S$ and may include, for example, the low pass filter 104, error detector/integrator 106, and source driver 110 of FIG. 2, arranged and operating in the manner previously described. The source monitor signal is also supplied to an input of a differential amplifier 220. The data signal from variable gain amplifier 210 is supplied to the other input of differential amplifier 220. The output of amplifier 220 is a compensated WO data signal. Although not shown in FIG. 3, suitable delay elements may be included in system 200 to provide phase matching at the input of amplifier 220. The embodiment of FIG. 3 is illustrative of how the teachings of the present invention may be applied in systems without differential data detection channels. Other alternative embodiments will be apparent to those skilled in the art.

The present invention provides numerous advantages in optical recording and reproducing systems. Systems in accordance with the invention are generally less sensitive to factors such as misalignment of components, detector mismatch, preamplifier mismatch, and wavelength changes at the source. Additional advantages are provided in optical recording applications which utilize, for example, direct-read-during-write (DRDW) signals or beta measurements. A DRDW signal may be corrupted if, for example, the source power level varies during a write pulse. By employing the source noise subtraction of the present invention, DRDW signal modulation resulting from source power level variations can be significantly reduced. Beta measurements are well-known in the art and typically provide an indication of data signal modulation depth which can be used to determine suitable optical recording power levels. When the source power level variations are subtracted in accordance with the invention, beta measurements can be performed more accurately. It should be noted that both DRDW signal generation and beta measurements are considered herein as included within the more general operation of reading data from an optical medium.

While presently preferred embodiments of the invention have been shown and described, it will be manifest that many additional changes and modifications may be made therein without departing from the essential spirit of the invention. It is intended, therefore, in the annexed claims, to cover all such changes and modifications as may fall within the true scope of the invention.

| PARTS LIST | |
|---|---|
| C1 | capacitor |
| $C_{A1}$, $C_{A2}$ | capacitors |
| $C_{B1}$, $C_{B2}$ | capacitors |
| $V_C$, $V_{C1}$, $V_{C2}$ | control voltages |
| $V_S$ | set point voltage |
| 20 | optical data storage system |
| 32 | optical source |
| 34 | collimating lens |
| 36 | beam splitter/expander |
| 37 | beam splitter surface |
| 38 | detector focusing lens |
| 40 | front facet detector |
| 44 | objective lens |
| 46 | optical storage medium |
| 46A | data storage surface |
| 46B | transparent substrate |
| 50 | beam splitter |
| 51 | beam splitter surface |
| 52 | detector focusing lens |

-continued

PARTS LIST

| | |
|---|---|
| 54 | detector array |
| 56 | lens |
| 58 | wave plate |
| 60 | beam splitter |
| 61 | beam splitter surface |
| 62, 64 | detectors |
| 63, 65 | preamplifiers |
| 66, 68 | variable gain amplifiers |
| 72 | differential amplifier |
| 76 | summing amplifier |
| 78 | differential amplifier |
| 80 | amplifier |
| 100 | source power control circuit |
| 102 | preamplifier |
| 104 | low pass filter |
| 106 | error detector/integrator |
| 108 | integrating amplifier |
| 110 | source driver |
| 112 | delay element |
| 122, 124 | low pass filters |
| 130, 132 | error detector/integrators |
| 134, 136 | amplifiers |
| 140, 142 | feedback signal line |
| 150 | delay element |
| 200 | optical data storage system |
| 205 | quarter-wave plate |
| 208 | detector array |
| 210 | variable gain amplifier |
| 215 | source power control circuit |
| 220 | differential amplifier |

We claim:

1. In an optical system in which data is read from an optical medium using an incident radiation beam, an apparatus comprising:

a source monitor detector to generate a source monitor signal by detecting radiation from an optical source providing the radiation beam;

an error detector coupled between the source monitor detector and the optical source, the error detector operative to generate an error signal corresponding to a difference between the source monitor signal and a reference signal, wherein a power level of the radiation beam is adjusted in response to the error signal;

a data signal generator adapted to receive a return beam resulting from application of the radiation beam to the medium and to generate a data signal from the return beam; and a signal combiner coupled to the source monitor detector and the data signal generator and operative to combine the data signal and the source monitor signal to provide a compensated data signal.

2. The apparatus of claim 1 wherein the data signal generator further includes:

first and second detectors for detecting first and second portions of the return beam, respectively;

first and second gain control circuits coupled to the first and second detectors, respectively, and receiving first and second detected signals therefrom, respectively, wherein each of the circuits is operative to alter the gain of a signal path of the corresponding detected signal in response to a control signal; and a signal difference circuit coupled to the first and second gain control circuits and responsive to the first and second detected signals from the gain control circuits to produce a magneto-optic data signal corresponding to a difference between the detected signals.

3. The apparatus of claim 2 wherein each of the first and second gain control circuits further includes:

a variable gain amplifier connected to the corresponding detector and having a control signal input for receiving the control signal;

a low pass filter connected to an output of the variable gain amplifier; and an integrating amplifier connected to the low pass filter and having a feedback path with a capacitive element therein, the integrating amplifier having a first input for receiving the detected signal from the low pass filter, a second input for receiving the reference signal and an output corresponding to the control signal.

4. The apparatus of claim 3 wherein the variable gain amplifiers in the gain control circuits are matched amplifiers in a multiple amplifier device.

5. The apparatus of claim 3 wherein the low pass filters have a cut-off frequency of about 100 kHz or less, such that the variable gains of the gain control circuits are controlled in response to low-frequency amplitude differences between the reference signal and the first and second detected signals, respectively.

6. The apparatus of claim 2 wherein the data signal generator further includes a summing amplifier coupled to the first and second gain control circuits and responsive to the first and second detected signals from the gain control circuits to produce a write-once data signal corresponding to a sum of the first and second detected signals.

7. The apparatus of claim 1 wherein the reference signal is a predetermined reference voltage level.

8. The apparatus of claim 1 further including a delay element arranged in a signal path of at least one of the source monitor signal and the data signal to substantially match a phase of the source monitor signal and the data signal at an input of the signal combiner.

9. The apparatus of claim 1 wherein the error detector further includes:

a preamplifier connected to the source monitor detector and adapted to receive the source monitor signal therefrom;

a low pass filter connected to the output of the preamplifier and adapted to provide an output including low-frequency components of the source monitor signal; and an integrating amplifier having a first input coupled to the output of the low pass filter, a second input coupled to the reference signal, and an output coupled to the optical source.

10. The apparatus of claim 1 wherein the data signal generator further includes:

a data detector adapted to receive the return beam and to generate a data signal therefrom; and a gain control circuit adapted to receive the data signal and to adjust a signal level thereof in response to a control signal.

11. The apparatus of claim 1 further including an amplifier coupled between the source monitor detector and an input of the signal combiner, wherein the amplifier provides a gain of approximately two.

12. In an optical system in which data is read from an optical medium using an incident radiation beam, a method comprising the steps of:

generating a source monitor signal using radiation from an optical source providing the radiation beam;

generating an error signal corresponding to a difference between the source monitor signal and a reference signal;

controlling a power level of the radiation beam in response to the error signal;

generating a data signal from a return beam resulting from application of the radiation beam to the medium; and combining the data signal and the source monitor signal to provide a compensated data signal.

13. The method of claim 12 wherein first and second portions of the return beam are detected in first and second detectors, respectively, and the step of generating the data signal further includes the steps of:

controlling the gain of a signal path of the first detected signal in response to a first control signal;

controlling the gain of a signal path of the second detected signal in response to a second control signal; and generating a magneto-optic data signal corresponding to a difference between the detected signals.

14. The method of claim 13 wherein the steps of controlling the gain each further include the steps of:

providing a variable gain amplifier in the corresponding signal path, the variable gain amplifier having a control signal input for receiving the corresponding control signal;

low pass filtering an output of the variable gain amplifier; and generating the control signal by comparing the low pass filtered output of the variable gain amplifier to the reference signal.

15. The method of claim 12 wherein step of generating an error signal corresponding to a difference between the source monitor signal and a reference signal includes generating an error signal corresponding to a difference between the source monitor signal and a predetermined reference voltage level.

16. The method of claim 12 further including the step of substantially matching a phase of the data signal and the source monitor signal prior to the step of combining said signals to provide a compensated data signal.

17. The method of claim 12 wherein the step of generating an error signal further includes the steps of:

amplifying the source monitor signal;

low pass filtering the amplified source monitor signal to provide an output including low-frequency components of the source monitor signal; and integrating a difference between an amplitude of the low-frequency components and the reference signal.

18. The method of claim 12 wherein the step of generating a data signal further includes the step of summing first and second detected signals, corresponding to first and second portions of the return beam, to provide a write-once data signal.

19. The method of claim 18 further including providing additional gain in a signal path of the source monitor signal.

20. The method of claim 12 wherein the step of generating a data signal from the return beam further includes the steps of:

detecting the return beam in a data detector to provide the data signal; and adjusting a signal level of the data signal in response to a control signal.

21. An apparatus in which data is read from an optical storage medium using a radiation beam, the apparatus comprising:

a source monitor detector to generate a source monitor signal by detecting radiation from an optical source providing the radiation beam;

an error detector coupled between the source monitor detector and the optical source, the error detector operative to generate an error signal corresponding to a difference between the source monitor signal and a reference signal, wherein a power level of the radiation beam is adjusted in response to the error signal;

first and second differential detectors for generating first and second detected signals, respectively, from first and second portions of a return beam resulting from application of the radiation beam to the medium;

a first gain control circuit adapted to receive the first detected signal and to adjust a signal level thereof in response to a first control signal;

a second gain control circuit adapted to receive the second detected signal and to adjust a signal level thereof in response to a second control signal;

a signal difference circuit coupled to the first and second gain control circuits and responsive to the first and second detected signals from the gain control circuits to produce a magneto-optic data signal corresponding to a difference between the detected signals;

a summing circuit coupled to the first and second gain control circuits and responsive to the first and second detected signals from the gain control circuits to produce a write-once data signal corresponding to a sum of the first and second detected signals; and a signal combiner coupled to the source monitor detector and the summing circuit and operative to combine the write-once data signal and the source monitor signal to provide a compensated write-once data signal.

22. An apparatus in which data is read from an optical storage medium using a radiation beam, the apparatus comprising:

a source monitor detector to generate a source monitor signal by detecting radiation from an optical source providing the radiation beam;

an error detector coupled between the source monitor detector and the optical source, the error detector operative to generate an error signal corresponding to a difference between the source monitor signal and a reference signal, wherein a power level of the radiation beam is adjusted in response to the error signal;

a data detector adapted to receive a return beam resulting from application of the radiation beam to the medium, and to generate a data signal from the return beam;

a gain control circuit adapted to receive the data signal and to adjust a signal level thereof in response to a control signal; and a signal combiner coupled to the source monitor detector and the gain control circuit and operative to combine the data signal and the source monitor signal to provide a compensated data signal.

* * * * *